June 13, 1961　　　　J. DURST　　　　2,988,296
ARRANGEMENT FOR A CAMERA OPERATING LEVER
Filed Aug. 18, 1959　　　　2 Sheets-Sheet 1
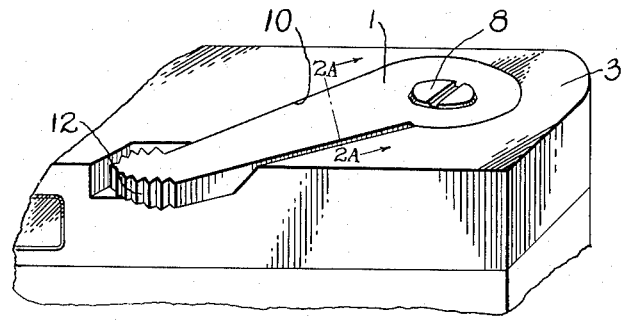
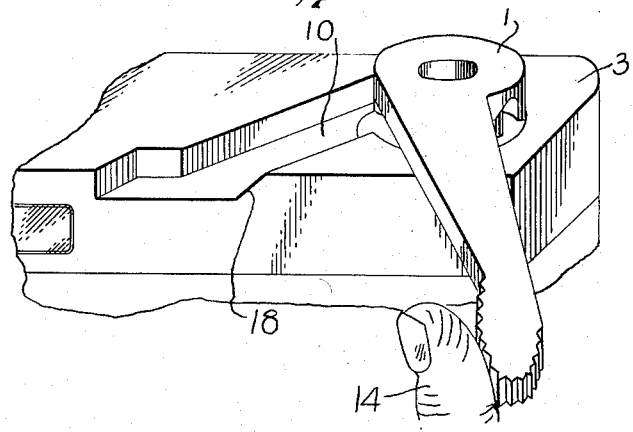
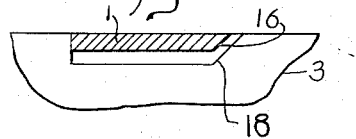
INVENTOR
Julius Durst
BY Connolly and Hutz
ATTORNEYS June 13, 1961 — J. DURST — 2,988,296
ARRANGEMENT FOR A CAMERA OPERATING LEVER
Filed Aug. 18, 1959 — 2 Sheets-Sheet 2
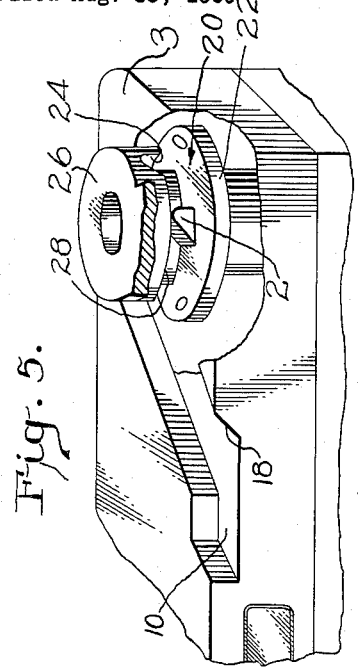
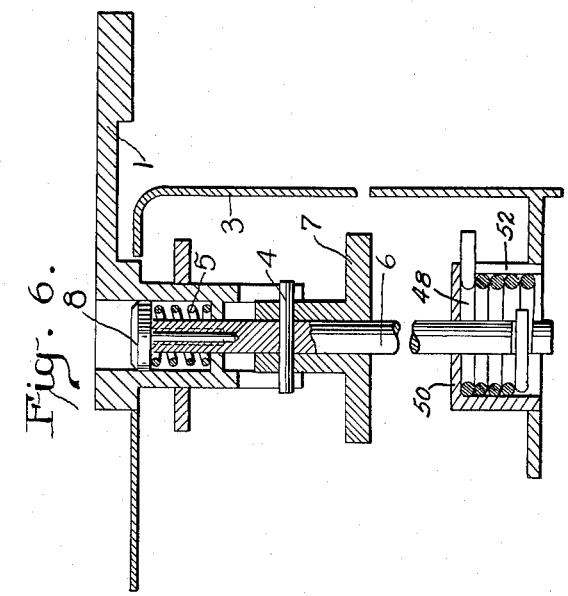
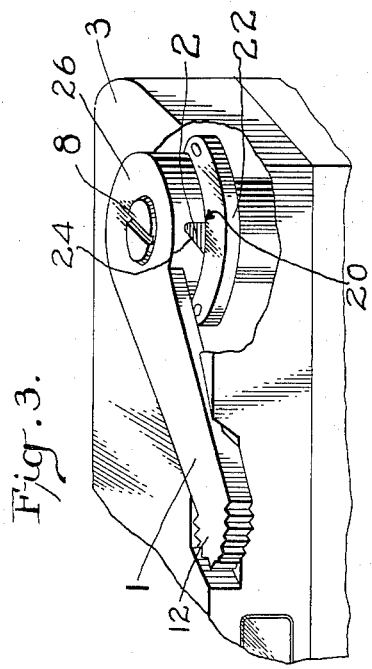
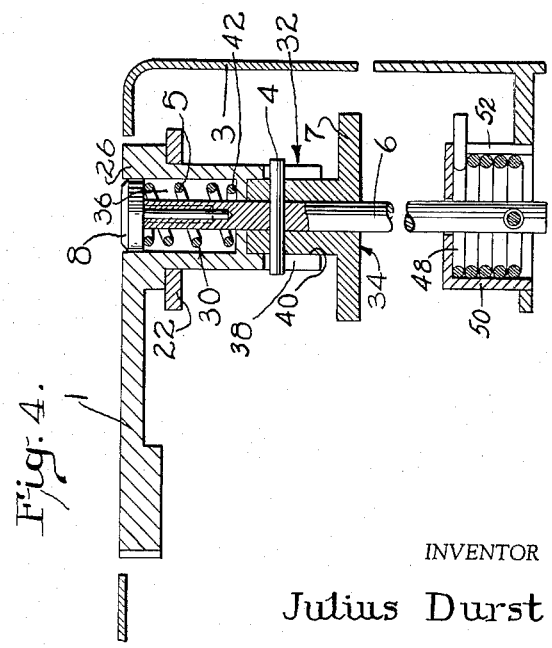
INVENTOR
Julius Durst
BY Connolly and Hutz
ATTORNEYS

United States Patent Office 2,988,296
Patented June 13, 1961

2,988,296
ARRANGEMENT FOR A CAMERA OPERATING LEVER
Julius Durst, Bressanone, Italy, assignor to said Julius Durst and Durst Soc. p.A., Fabbrica Macchine ed Apparecchi Fototecnici, Bolzano, Italy
Filed Aug. 18, 1959, Ser. No. 834,465
Claims priority, application Italy Sept. 25, 1958
8 Claims. (Cl. 242—71.3)

This invention relates to an arrangement for a lever for simultaneously advancing the film and tensioning the shutter in a photographic camera, and more particularly relates to such an arrangement in which this lever is made to fit as closely as possible to the casing of the camera.

Combined film-transporting and shutter-tensioning levers have been extended through slots in camera casings in the endeavor of making the unit as compact and smooth as possible and convenient to operate. However, these slots which are opened when the lever is moved through its working stroke have the disadvantage of permitting dirt and other foreign matter to enter and accumulate within the casing. Attempts have been made to avoid this by replacing these rotary levers by plungers which are advanced into their operative position or reinserted within the camera when the casing is either opened or closed. However, these plunger mechanisms require a prohibitive amount of extra power to operate them.

An object of this invention is to provide a simple and economical means of mounting a combined film-transporting and shutter-tensioning lever in a smooth manner within a camera casing without incorporating apertures through which foreign matter can enter and accumulate within the camera.

In accordance with this invention, a rotatable film-transporting and shutter-tensioning lever is mounted within an open-ended recess formed upon an outer surface of the camera casing. Resilient means urges the lever into this recess with only its tip extending. Inclined means provide an inclined area of contact between the lever and the casing which causes the lever to rise out of its recess when it is rotated, and the side of the recess in the path of movement of the lever and the adjacent side of the lever are constructed and arranged to permit the lever to clear the side of the recess as it swings and rises above the casing. On its return movement, the lever drops automatically into its recess to provide a substantially smooth and closed exterior for the camera. Furthermore, the resultant climbing movement of the lever facilitates its operation because it corresponds to the natural swinging motion of the thumb that operates it.

Novel features and advantages of the present invention will become apparent to one skilled in the art from a reading of the following description in conjunction with the accompanying drawings wherein similar reference characters refer to similar parts and in which:

FIG. 1 is a perspective view of an embodiment of this invention in the recessed condition;

FIG. 2 is a perspective view similar to FIG. 1 in the externally rotated position;

FIG. 2A is a cross-sectional view taken through FIG. 1 along the line 2A—2A;

FIG. 3 is a perspective view similar to FIG. 1 partially broken away;

FIG. 4 is a cross-sectional view in elevation of the portion shown in FIG. 3;

FIG. 5 is a perspective view similar to FIG. 2, partially broken away; and

FIG. 6 is a cross-sectional view taken through the portion shown in FIG. 5.

In FIG. 1 is shown a combined film-transporting and shutter-tensioning lever 1 disposed in the rest or recessed position in which it lies almost fully enclosed within open-ended recess 10 formed in the top of camera casing 3. In this position, only the tip 12 of lever 1 which is, for example, knurled or serrated to facilitate grasping, extends outside of the casing. The rest of the casing remains relatively closed and free of projections to present an attractive smooth exterior and prevent any dirt or foreign matter from entering or accumulating within the casing. This compact configuration also avoids any problem of projections snagging within carrying cases or within the pocket of a cameraman.

In FIG. 2, lever 1 is shown in the externally rotated condition in which it is fully raised by actuation of thumb 14 out of recess 10 to advance the film and tension or cock the shutter. As lever 1 is rotated, it automatically rises out of the recess with its side 16 which for example, is made inclined to correspond to inclined side 18 of recess 10 (as shown in FIG. 2A, clearing adjacent side 18 of the recess.

Details of this arrangement are shown in FIGS. 3–6 in which FIGS. 3 and 5 show inclined means 20 providing an area of contact between the lever and casing which causes the lever to rise out of the recess as it is rotated. This inclined means 20 includes, for example, an inclined projection 2 mounted upon flange 22 secured to the camera casing, and a similar notch 24 cut within the corresponding portion of the hub 26 of lever 1 which receives projection 2 in the recessed or rest position. In FIG. 5, lever 1 and hub 26 are rotated to the condition in which the bottom surface 28 of hub 26 rides upon the top of projection 2 and notch 24 is rotated a distance beyond projection 2. This maintains lever 1 in the externally rotated position against the force of resilient means 30, later described in detail in conjunction with FIGS. 4 and 6. As lever 1 rotates from the position of FIG. 3 to that of FIG. 5, its inclined side 16 clears adjacent inclined side 18 of recess 10 to avoid interference therebetween by virtue of its disposition at an angle to the top of casing 3 which is approximately as great as the similar angle of projection 2 and notch 24.

FIGS. 4 and 6 show axially movable coupling means 32 which connects lever 1 with film-winding means 34 which, for example, includes a flange 7 and a stem 6 which extends upwardly into a socket 36 formed within the top of lever hub 26. A pin 4 is perpendicularly mounted within stem 6 and is engaged by slots 38 formed in the lower end of lever hub 26 which is also centrally bored to provide a lower socket 40 for receiving the hub of flange 7. This pin and slot connection maintains lever 1 engaged with film-winding means 34 throughout its angular and axial movement.

Resilient means 30 urging lever 1 towards recess 10 includes for example, a head 8 on the top of stem 6 and a compression spring 5 disposed within socket 36 to react between head 8 and the floor 42 of socket 36 to resiliently force lever 1 towards casing 3 and recess 10 because of the axial restraint on stem 6 (not specifically shown). In FIG. 6, lever 1 is shown in the raised position in which it has accordingly compressed spring 5. In this position, a torsion spring 48 shown in FIGS. 4 and 6 reacts within well 50 between the walls of slot 52 and shaft 6 to rotate lever 1 back towards the recessed or rest position which in conjunction with spring 5 automatically drops lever 1 into recess 10 as it is released.

What is claimed is:

1. An arrangement for a rotatable operating lever in a photographic camera comprising a casing, a manually-actuable lever rotatably mounted upon said casing with the plane of rotation of said lever disposed substantially parallel to an adjacent wall of said casing, said wall of said casing being formed to include a recess which is substantially filled by said lever, a portion of said lever extending out of said recess to permit said lever to be grasped to rotate it, a film-winding means disposed within said casing, axially movable coupling means connecting said lever to said film-winding means, resilient means urging said lever towards said recess, inclined means disposed between said lever and said casing and providing an inclined area of contact between said lever and said casing, said inclined means being constructed and arranged to cause said lever to rise out of said recess when it is rotated, and the side of said recess in the path of movement of said lever and the adjacent side of said lever being constructed and arranged to permit said lever to clear said side of said recess as it is rotated to rise above said casing.

2. An arrangement as set forth in claim 1 wherein said lever includes a hub, said inclined means comprises an inclined cam surface mounted upon said casing and a corresponding notch which is cut within the hub of said lever.

3. An arrangement as set forth in claim 1 wherein said side of said recess and said adjacent side of said lever are spaced apart together inclined at an angle to said wall approximately as great as the similar angle of said inclined means.

4. An arrangement as set forth in claim 1 wherein said lever includes a hub, the outer portion of the hub of said lever is centrally bored to provide a socket, said resilient means includes an axially stationary stem extending axially from said winding means through the axis of said lever into said socket, a head being formed on the end of said stem disposed within said socket, and a compression spring disposed within said socket and reacting between said head and the floor of said socket for urging said lever towards said recess.

5. An arrangement as set forth in claim 1 wherein said axially movable coupling means comprises pin and slot means angularly connecting said lever to said film-winding means.

6. An arrangement as set forth in claim 1 wherein said recess extends through another wall of said casing which intersects said wall including said recess to provide an open end for said recess, and the end of said lever remote from its axis extends through said open end to provide convenient access thereto.

7. An arrangement as set forth in claim 6 wherein said recess is formed in the top wall of said camera with said open end extending through the back wall of said camera to conveniently permit actuation of said lever by the thumb of an operator.

8. An arrangement as set forth in claim 1 wherein said resilient means includes a resilient torsion means which reacts between said lever and said casing whereby said lever is urged to rotate toward said recess when it is rotated to positions which are angularly displaced from said recess.

References Cited in the file of this patent

UNITED STATES PATENTS

| | | |
|---|---|---|
| 1,469,830 | Tessier | Oct. 9, 1923 |
| 2,849,938 | Gebele et al. | Sept. 2, 1958 |